United States Patent [19]

Sausse et al.

[11] 3,783,454
[45] Jan. 8, 1974

[54] SURGICALLY IMPLANTABLE PROSTHETIC DUCT FOR THE REMOVAL OF BIOLOGICAL LIQUIDS

[75] Inventors: Andre Sausse, Hauts-de-Seine; Andre Stern, Paris, both of France

[73] Assignee: Rhone-Poulenc S.A., Paris, France

[22] Filed: Mar. 29, 1972

[21] Appl. No.: 239,218

[30] Foreign Application Priority Data
Apr. 7, 1971 France .............................. 7112306

[52] U.S. Cl. ..................... 3/1, 128/334 R, 128/348, 128/350 R, 128/350 V
[51] Int. Cl. ....................... A61f 1/24, A61m 27/00
[58] Field of Search ............................. 3/1, DIG. 1; 128/348–350, 350 V, 334 R, 334 C

[56] References Cited
UNITED STATES PATENTS
3,633,585  1/1972  McDonald .......................... 128/348
3,515,124  6/1970  Gurchot ............................ 128/348 X
3,434,869  3/1969  Davidson ..................... 128/349 R X FOREIGN PATENTS OR APPLICATIONS
1,211,941  10/1959  France ........................... 128/350 V

OTHER PUBLICATIONS

"A Large–Vessel Applique A–V Shunt for Hemodialysis" by G. I. Thomas, Transactions Amer. Society for Artificial Internal Organs, Vol. XV, 1969, pages 288–292.

"Total Bilateral Polyvinyl Ureteral Substitutes in the Dog" by A. H. Ulm et al., Surgery, Vol. 45, No. 2, pages 313–320, Feb. 1959.

*Primary Examiner*—Richard A. Gaudet
*Assistant Examiner*—Ronald L. Frinks
*Attorney*—John W. Malley et al.

[57] ABSTRACT

A duct for the removal of biological liquids, especially urine, in the form of a tubular body having internal and external surfaces, at least, of silicone elastomer. Near its upper end, e.g., for connection to a ureter, the body is surrounded by a woven or knitted textile sheath, which is secured by silicone elastomer adhesive to the body and is used as a suturing member for securing the duct to the ureter. Near its lower end the body is provided with a similar sheath or a radially outwardly projecting flange to secure it, e.g., to a bladder.

11 Claims, 3 Drawing Figures

PATENTED JAN 8 1974　　　　　　　　　　　　　　　3,783,454

SURGICALLY IMPLANTABLE PROSTHETIC DUCT FOR THE REMOVAL OF BIOLOGICAL LIQUIDS

The present invention relates to a duct for the removal of biological liquids, especially urine.

If a ureter no longer allows the removal of urine (for example, as a result of a compression exerted by a tumour), it is important rapidly to create a new outlet or else the kidney would perish as a result of an ureterohydronephrosis. For this reason, it has been proposed to replace the ureter by another duct of autogenous origin, for example, a loop or small intestine, or to displace the ureter in order to make it end at another point of the bladder or even at the skin.

These techniques use living tissues, capable of being invaded by cancerous cells and incapable of resisting compression. The artificial materials tested up to the present time are not satisfactory; plasticised polyvinyl chloride is not tolerated well by the living tissues, polyethylene and fluorinated resins (PTFE) are too rigid and, furthermore, the first two assist the deposition of concretions.

According to the present invention there is provided a duct for the removal of biological liquids comprising a tubular body at least the interior and exterior surfaces of which are formed from a silicone elastomer material, a tubular sheath of textile fabric secured by a silicone elastomer adhesive around said body near the upper end thereof and retaining means at or near the lower end of said body.

Such a duct is well tolerated by the tissues and resists encrustation and is easy to stitch. The textile sheaths allow firstly the stitches to be held well and, secondly, a good mechanical anchoring by cellular colonization.

The dimensions of the duct must be suited to the subject being treated; its length must be sufficient to enable it to connect the organs above and below it without excessive tension on the stitches; the external diameter of its upper sheathed extremity must be slightly greater than the internal diameter of the channel to which it must be stitched, and this channel will be dilated before being slipped around the sheath. It is naturally important that the dilation is not excessive, as this would run the risk of causing a necrosis of the channel; it is practical to have available a series of tubes of graded lengths and diameters, in order to be able to choose the dimensions which suit the patient best.

The thickness of the wall is not critical, but it should be chosen so that the duct resists crushing by the neighbouring organs while still possessing a sufficient flexibility to adapt to the movements of the body. Although a thin tube reinforced with a strong helix (of coarse nylon fibre, for example) can be used, it is usually preferable to use a non-reinforced tube, of which the internal/external diameters are in the ratio of between 10/12 and 10/30, preferably 10/13 to 10/20.

Thus, for an artificial ureter, it is possible to use lengths of 12 – 18 – 24 cm. and diameters (internal/external) of 3.6/5.6 – 4.0/6.3 – 4.5/7 mm.

The upper end of the duct can have a gradual thinning of its wall, either externally, or internally, or on both its faces, along substantially conical surfaces, with the angle at the apex being less than 90°, the thickness at the very end of the wall being as low as possible. This arrangement does away with the sudden reduction in the free cross-section on passing from the natural channel to the prosthesis, a reduction which would favour the stagnation of the fluid and the formation of concretions. At the same time, it increases the flexibility of the extremity of the prosthesis, which presents less risk of injuring the natural channel.

The uppper edge of the upper sheath can be covered with silicone elastomer, which isolates it completely from the fluid being removed. This arrangement also lowers the risk of the appearance of concretions. The upper sheath can cover the very end section of the tube, or it can also leave a length of 10 to 20 mm. of bare tube free at the upper extremity, which represents the part to be embedded in the stump of the ureter. In this case, the sheath is not impregnated with elastomer, in order to assist its colonization by the connective tissue. The whole of the internal wall of the duct can be varnished by means of a liquid silicone composition which can be vulcanized to form an elastomer without appreciable change in volume (usually less than five percent), the vulcanizing being brought about after perfect smoothing of the surface under the effect of the surface tension. This arrangement also lowers the risk of the appearance of concretions. The retaining means may be a further textile sheath which surrounds the lower extremity, and an external bead may be provided to facilitate the stitching and achieves a better anchoring of the prosthesis in the wall of the receiving organ. This bead can be produced by forming a peripheral flange on the elastomer duct, or by rolling a part of the sheath back on itself before gluing it to the duct.

As a variant, the lower extremity can be devoid of a sheath and can slide freely into the wall through which the tube passes (for example, the vesical wall). A circular flange forming a shoulder then prevents the tube coming out of the organ into which it opens.

The lower extremity of the duct can be equipped with a non-return valve such as a flap valve which prevents flow-back towards the secreting organ. The various types of known flap valves can be used, in particular the lip-type flap valves consisting of a flexible tube with a thin wall, the free end of which is flattened along one or more axial planes (for example, the so-called "duck's beak" flap valve).

The sheaths can be made of any textile which can be colonised, such as nylon, fluorinated polymer, polyvinyl chloride or polyester (especially glycol polyterephthalate), the latter product generally being preferred. The sheath is usually a tubular knitted fabric but it can also be of a woven fabric, for example a brushed woven fabric or a cropped velvet. Although it can be fixed by mechanical clamping (its internal diameter being, for example, slightly less than the external diameter of the tubular body), it is preferable to fix it by gluing at its edges, or, better still, over its entire surface.

The partial impregnation of the sheaths with the glue can be completed, if desired, by an impregnation in depth by means of an elastomer solution which has been suitably diluted. It is also possible, according to the known techniques, to fill the residual pores in the sheath with an inoffensive biodegradable material (for example, collagen), which will gradually be replaced by the colonization tissues.

The ducts according to the invention can be used for any replacement of a natural duct. For example, they allow the removal of bile either into the stomach, or into the small intestine, or the removal of urine, especially from a kidney.

The invention will be better understood from the following description, given merely by way of example, showing how an artificial ureter according to the invention can be put into place. In the description, reference is made to the accompanying drawings, in which:

FIG. 1 shows the extremities of an artificial ureter, the middle section being shown in phantom; and FIGS. 2 and 3 show modifications of the upper and lower extremities respectively.

According to FIG. 1, a tubular body, of silicone elastomer of medical quality, varnished internally at 2, is 180 mm. long and has diameters of 4/6.3 mm. for the main portion and 5.3/6.3 mm. at the upper extremity, the internal surface widening out at the mouth to about 10 mm.

An upper sleeve 3 of tubular knitted fabric of multifilament polyester yarns of 0.2 mm. diameter, 25 mm. long, is glued to the external surface of body 1 with a silicone glue which can be vulcanized to form an elastomer. The upper half 3a of the sleeve is impregnated by two successive soakings in a cyclohexane solution containing 20 percent of an organosilicone composition which can be vulcanised to form an elastomer, the upper edge being embedded in a continuous layer of elastomer 3b. A lower textile sleeve 4 is 10 mm. long and its lower edge is rolled up into a bead 4a. The tubular body 1 extends for 10 mm. below the bead, and ends in a "duck's beak" flap valve 5, 0.2 mm. thick.

In order to put the prosthesis into place, the ureter 8 is cut 30 mm. below the pelvis of the kidney, it is dilated and the impregnated portion of the upper sheath is inserted in it. The extremity of the stump is stitched with blind stitches 7 in the thickness of the sheath. The compression exerted by the wall of the ureter avoids the formation of a cul-de-sac, a source of concretions or of infected foci, and assists in the fixing of the prosthesis.

The lower extremity of the prosthesis is then inserted through the wall of the bladder 9, the bead being stitched in the thickness of the wall, resting on the external face.

Patients carrying such prostheses have been observed over a period of 4 to 8 months without showing particular pathological signs due to the prostheses themselves.

Figure 1:
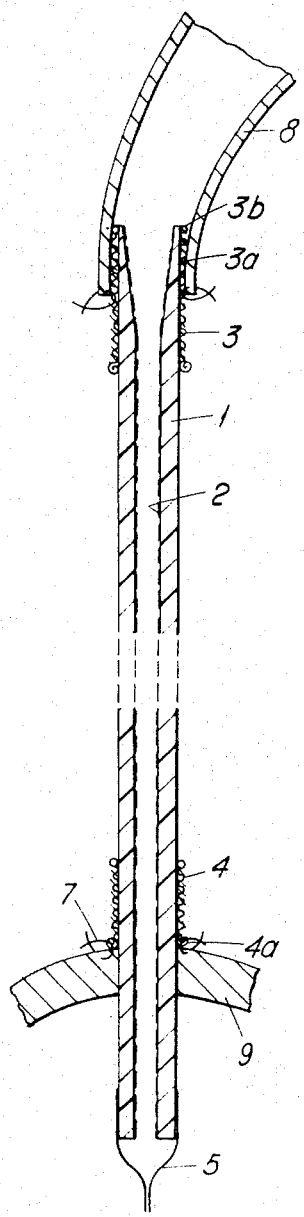
Figure 2:
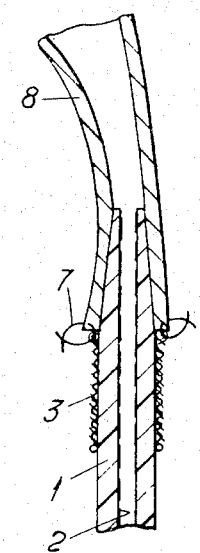
FIG. 2 illustrates a modification of the upper extremity, in which the wall becomes thinner on its external surface, and the sheath (not impregnated) is set back 10 millimetres and shows the limit to which the tube can be embedded in the ureter.
Figure 3:
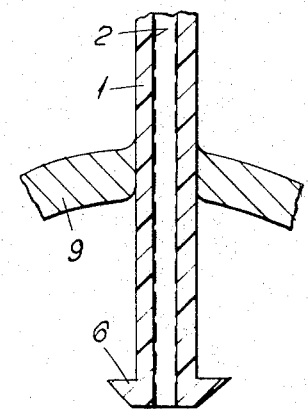
FIG. 3 illustrates a modification of the lower end in which there is no sheath, the tube simply ending in a stop ring 6, also of silicone elastomer. With this modification, the stitching of the lower extremity is not necessary.

We claim:

1. A surgically implantable prosthetic duct for the removal of biological liquids, said duct comprising a flexible, cylindrical wall along its entire length forming a tubular body, interior and exterior surfaces of said body, at least said interior and exterior surfaces being formed of a silicone elastomer material, upstream and downstream ends of said body, a tubular sheath of a cell-colonizable textile fabric secured by a silicone elastomer adhesive around said body near the upstream end thereof at least a substantial part of that portion of the sheath which is adhesively connected to said body being sufficiently porous to allow tissue cellular colonization thereinto, the cylindrical wall thinning adjacent and toward the upstream end of said body, so as to terminate in an upstream end section of reduced wall thickness to reduce stagnation of biological liquid and formation of concretions when implanted within a body channel, and retaining means on the exterior surface near the downstream end of said body.

2. A duct as claimed in claim 1, wherein the tubular sheath fabric is selected from the group consisting of knitted and woven fabrics.

3. A duct as claimed in claim 1, wherein at least one of the interior and exterior surfaces at said upstream end of said body is tapered conically, the angle at the apex of the conical taper being less than 90°.

4. A duct as claimed in claim 1, wherein the upstream end of said body projects beyond the sheath by a distance of between 10 mm. and 20 mm.

5. A duct as claimed in claim 1, and further comprising an upper edge to said sheath, wherein said upper edge is covered with silicone elastomer.

6. A duct as claimed in claim 1, wherein said retaining means comprises a further sheath of cell colonizable textile fabric.

7. A duct as claimed in claim 1, wherein said retaining means comprises a radially outwardly projecting firm stop ring on said body.

8. A duct as claimed in claim 1, wherein said downstream end is provided with a non-return valve.

9. A duct as claimed in claim 1, wherein said inner surface of said body is coated with a smooth coating of silicone elastomer.

10. A duct as claimed in claim 6 wherein said sheath is rolled up to form an external bead.

11. A duct as claimed in claim 6 wherein said further sheath surrounds and is secured to said body near its downstream end.

* * * * *